US011915014B2

(12) United States Patent
Deka (10) Patent No.: US 11,915,014 B2
(45) Date of Patent: Feb. 27, 2024

(54) CONSENSUS BASED DETERMINATION OF STABLE CONFIGURATION

(71) Applicant: Microsoft Technology Licensing, LLC, Redmond, WA (US)

(72) Inventor: Amarjyoti Deka, Bothell, WA (US)

(73) Assignee: Microsoft Technology Licensing, Redmond, WA (US)

( * ) Notice: Subject to any disclaimer, the term of this patent is extended or adjusted under 35 U.S.C. 154(b) by 248 days.

(21) Appl. No.: 17/405,195

(22) Filed: Aug. 18, 2021

(65) Prior Publication Data

US 2023/0058542 A1    Feb. 23, 2023

(51) Int. Cl.
   G06F 9/44      (2018.01)
   G06F 9/445     (2018.01)
   G06F 21/64     (2013.01)

(52) U.S. Cl.
   CPC .......... G06F 9/44505 (2013.01); G06F 21/64 (2013.01)

(58) Field of Classification Search
   CPC ................. G06F 9/44; G06F 1/32; G06F 1/12
   See application file for complete search history.

(56) References Cited

U.S. PATENT DOCUMENTS

| 7,895,591 | B2* | 2/2011 | Spears ...................... G06F 8/61 717/172 |
| 8,244,839 | B2 | 8/2012 | Beaty et al. |
| 8,572,679 | B1 | 10/2013 | Wang et al. |
| 9,619,544 | B2 | 4/2017 | Vermeulen et al. |
| 10,491,513 | B2* | 11/2019 | Attak ..................... H04L 45/30 |
| 10,841,100 | B2 | 11/2020 | Lam et al. |
| 10,986,174 | B1* | 4/2021 | Sharma ............... H04L 12/4641 |
| 2013/0339494 | A1 | 12/2013 | Mithyantha |
| 2019/0036702 | A1* | 1/2019 | Kano ....................... G09C 1/00 |
| 2019/0235946 | A1 | 8/2019 | Guo et al. |

FOREIGN PATENT DOCUMENTS

| CN | 109960512 A | 7/2019 |
| WO | 2016085516 A1 | 6/2016 |

OTHER PUBLICATIONS

"International Search Report and Written Opinion Issued in PCT Patent Application No. PCT/US22/035389", dated Sep. 27, 2022, 12 Pages.
"Algorand Node Types", Retrieved from: https://web.archive.org/web/20210421113830/https://developer.algorand.org/docs/run-a-node/setup/types/, Apr. 21, 2021, 3 Pages.
Angluin, et al., "Stabilizing Consensus in Mobile Networks", In International Conference on Distributed Computing in Sensor Systems, Jun. 18, 2006, 13 Pages.
Vizier, et al., "ComChain: A Blockchain with Byzantine Fault-Tolerant Reconfiguration", In Journal of Concurrency and Computation: Practice and Experience, Jun. 25, 2020, pp. 1-27.

* cited by examiner

*Primary Examiner* — Keshab R Pandey
(74) *Attorney, Agent, or Firm* — Christopher J. Volkmann; Kelly, Holt & Christenson, PLLC.

(57) ABSTRACT

When a configuration is generated in a distributed computing system, a first group of nodes is selected for validating the configuration and the configuration is deployed on the first group of nodes. When the first nodes in the group of nodes validate the configuration, the nodes sign the configuration with a signature. When a subsequent node is to implement the configuration, the subsequent node validates the signature on the configuration to ensure that the nodes in the first group of nodes validated the configuration. If the signature is validated, the subsequent node deploys the configuration.

20 Claims, 7 Drawing Sheets

CONSENSUS BASED DETERMINATION OF STABLE CONFIGURATION

BACKGROUND

Computing systems are currently in wide use. Some such computing systems are distributed computing systems in which a system is implemented across a plurality of networked computing systems.

In the distributed computing system, each networked system is a collection of independent components located on different machines that share messages with one another in order to achieve common goals. The resources at different computing system locations can be referred to as nodes. The nodes in a distributed computing system can be arranged in different rings.

The rings may have different users and a different level of exposure to users. For instance, the rings may include a test ring, and a production ring. The test ring may provide relatively little exposure to users so that test software configurations can be deployed in the test ring and tested prior to being deployed in a production ring which provides more exposure to users.

The discussion above is merely provided for general background information and is not intended to be used as an aid in determining the scope of the claimed subject matter.

SUMMARY

When a configuration is generated in a distributed computing system, a first group of nodes is selected for validating the configuration and the configuration is deployed on the first group of nodes. When the nodes in the first group of nodes validate the configuration, the nodes sign the configuration with a signature. When a subsequent node is to implement the configuration, the subsequent node validates the signature on the configuration to ensure that the nodes in the first group of nodes validated the configuration. If the signature is validated, the subsequent node deploys the configuration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, in a distributed computing system, different nodes can be used to run applications or provide services to different sets of users. The nodes of the distributed computing system can be arranged in rings, such as in a test ring, a production ring, etc. Therefore, configuration changes can be deployed in different rings, or in different nodes of the distributed computing system, at different times. Misconfiguration, or configuration changes that do not work, can lead to catastrophic failures in distributed computing systems.

Therefore, in some current computing systems, the configuration changes are deployed to the distributed computing system using a gradual saturation of the distributed computing system, in which the configuration is first deployed to a lower ring (such as a test ring) and then gradually deployed to larger and larger rings. This gradual saturation is done in the hopes that only stable configuration changes will be deployed to the entire distributed computing system. For instance, a configuration change that is deployed at a lower ring (such as in a test ring) may be considered safe to be rolled out to a higher ring.

However, such a gradual saturation can have drawbacks. For instance, it may be that the nodes in the lower ring do not access the configuration change, or run the code corresponding to the configuration change so that, simply because the configuration change operates in the lower ring of nodes, this does not mean that the configuration change actually works. An example of this may be a localization change. If the lower ring of nodes does not use a language that calls upon the localization change, then the configuration change may run at the lower ring of nodes without a problem, even though the localization change has errors. Also, if the saturation is to proceed ring-by-ring, this results in relatively slow rollout of a configuration change.

As another example of where the ring-by-ring rollout may have problems, assume the configuration change has code to tune node performance parameters so the code will be utilized on machines that have relatively high CPU usage. However, if the configuration change is implemented on a node in a lower ring that does not have such CPU usage, then the validation of the configuration change cannot be determined. by that node.

The present description thus proceeds with respect to a system that deploys a configuration change, for validation, on a first set of nodes that will actually run the configuration changes. Once the configuration changes are validated by a node in the first set of node, the nodes signs the configuration. When a subsequent node is ready to deploy the configuration changes, the subsequent node validates that each of the nodes in the first set of nodes has validly signed the configuration prior to itself deploying the configuration. This helps to assure that the configuration will be run prior to validation. It also allows a quicker rollout of the configuration.

Figure 1:
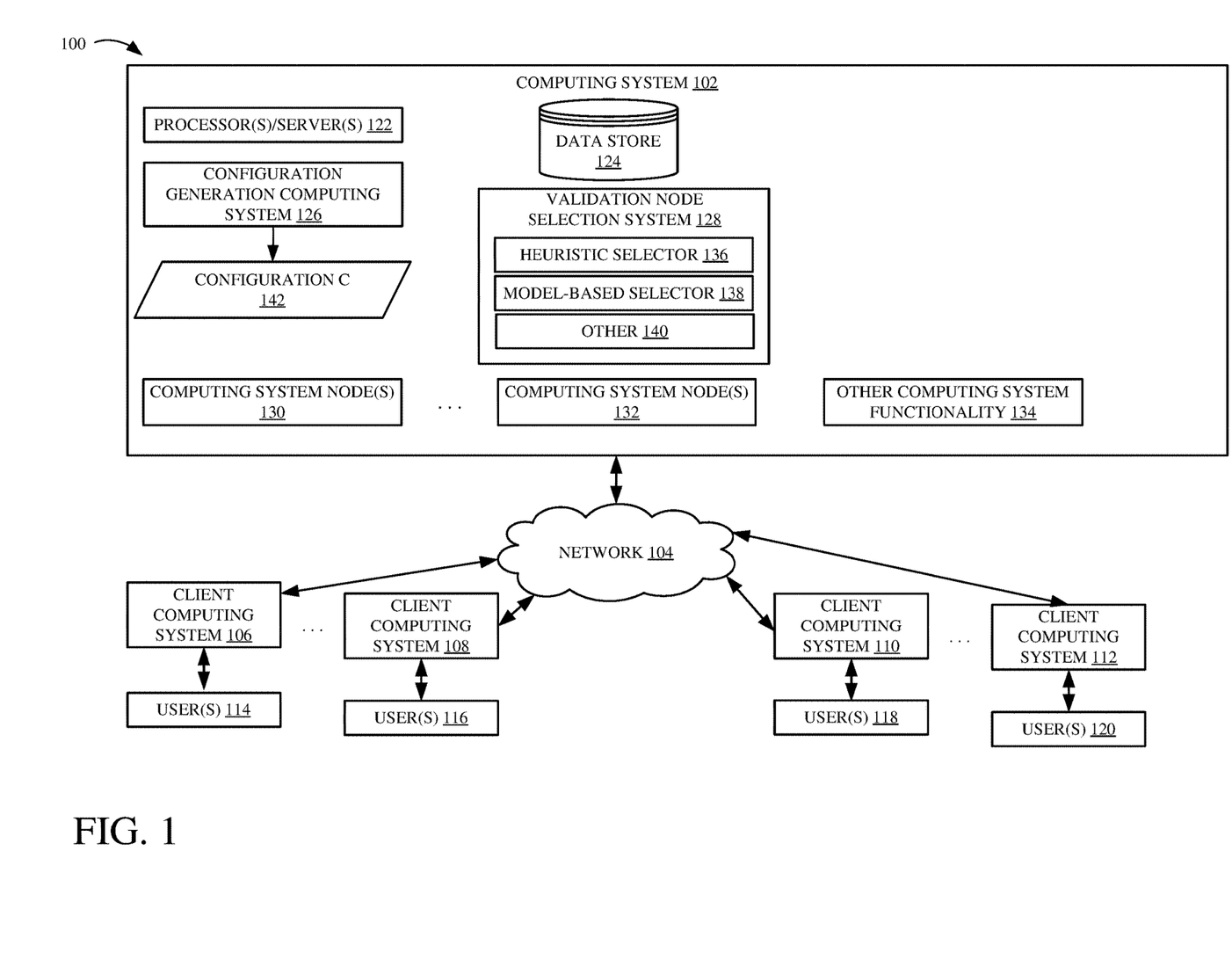
FIG. 1 is a block diagram of one example of a computing system architecture.

FIG. 1 is a block diagram of one example of a computing system architecture 100. Architecture 100 includes computing system 102 that may be accessed over network 104 by a plurality of different client computing systems 106, 108, 110, and 112. Each of the client computing systems 106-112 can generate user interfaces for interaction by corresponding users 114, 116, 118, and 120. The users interact with the user interfaces to control and manipulate the corresponding client computing system and some parts of computing system 102.

Network 104 can be a wide area network, a local area network, a near field communication network, a cellular communication network, a Wi-Fi network, or other networks. Network 104 can also be any of a wide variety of combinations of different types of networks.

In the example shown in FIG. 1, computing system 102 includes one or more processors or servers 122, data store 124, configuration generation system 126, validation node selection system 128, different sets of nodes 130-132, and other computing system functionality 134. Validation node selection system 128 can, itself, include heuristic selector 136, model-based selector 138, and other items 140.

Before describing the operation of architecture 100 in more detail, a description of some of the items in architecture 100, and their operation, will first be provided. Computing system nodes 130-132 illustratively implement a distributed computing system in which the nodes 130-132 provide services to client computing systems 106-112. The computing system nodes 130-132 may have front end systems that exposes an interface that can be accessed by the client computing systems 106-112. The nodes may have backend systems that operate on, manipulate, and store data for the various client computing systems 106-112.

Developers or other users can use configuration generation computing system 126 to generate a new configuration C labeled 142 in the block diagram of FIG. 1. Configuration C 142 may be an entirely new configuration, changes to an existing configuration, or it may reflect other items. Before configuration C 142 is deployed to any of the computing system nodes 130-132, validation node selection system 128 selects a subset of the nodes 130-132 for implementing the configuration C 142 so that the configuration C 142 can be validated before being rolled out to the other nodes 130-132. The selected subset of nodes can be referred to as a validating subset of nodes.

In one example, validation node selection system 128 arbitrarily selects the validating subset of nodes to validate configuration C 142. In another example, validation node selection system 128 identifies the validation subset of nodes that can be used to validate configuration C 142 by determining whether the nodes will actually run the code that is changed or otherwise reflected in configuration C 142. For instance, heuristic selector 136 can employ different heuristics, based upon the particular configuration C 142 that is to be validated, to identify the validating subset of nodes, of the computing system nodes 130-132, that will actually use or test the configuration C 142 before the configuration C 142 is rolled out more broadly to additional nodes. Model-based selector 138 can use a model that takes the configuration C 142 as an input and identifies the validating subset of nodes based on that input.

The subset of computing system nodes 130-132 that is selected to validate configuration C 142 then deploys configuration C 142 and runs the code corresponding to configuration C 142 to determine whether it operates properly. If so, the selected validating subset of nodes sign configuration C 142 so that, when configuration C 142 is selected for deployment on other nodes, those other nodes can validate the signature to ensure that configuration C 142 has been adequately validated by the validating subset of nodes.

The validating subset of nodes that are used to validate configuration C 142 can sign the configuration C 142 with independent signatures, or using a multi-signature system, or in other ways. Then, where an additional node is to deploy configuration C 142, and the additional node obtains the public keys corresponding to the validating subset of nodes to validate the signatures of the validating subset of nodes. If the signatures are valid, then the additional computing system node can deploy configuration C 142.

Figure 2:
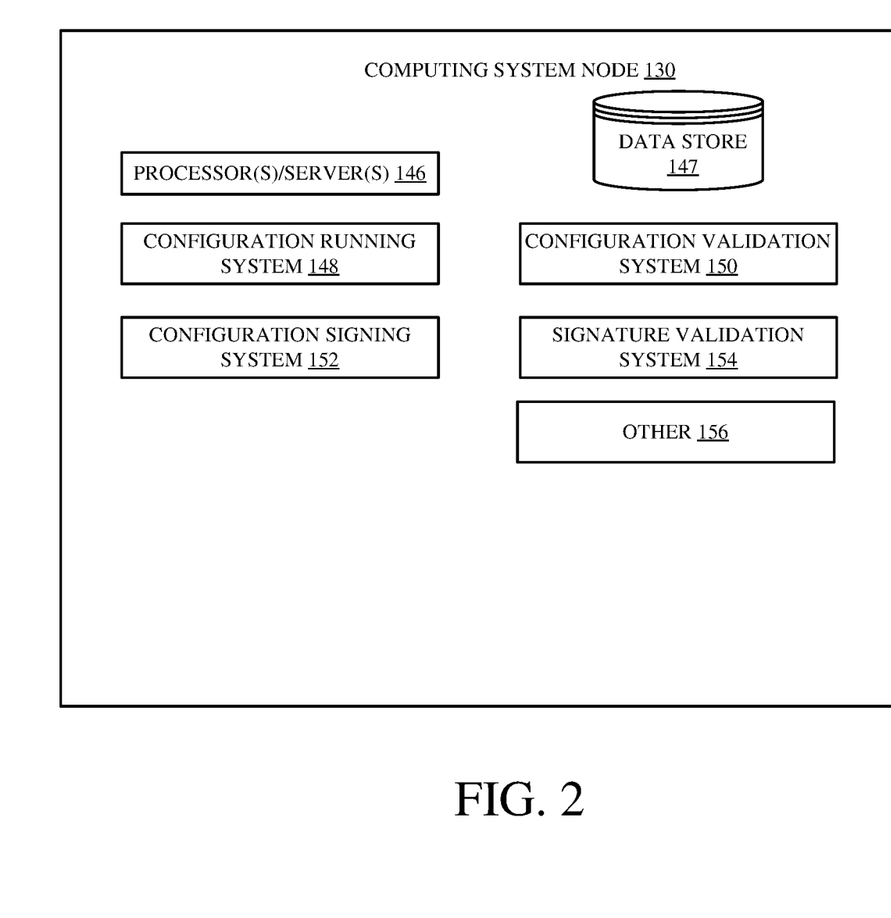
FIG. 2 is a block diagram of one example of a computing system node.

FIG. 2 is a block diagram showing one example of a computing system node 130 in more detail. Computing system nodes 130-132 can be similar or different. For purposes of the present discussion, it will be assumed that they are similar so that only computing system node 130 is described in more detail.

Computing system node 130 can include one or more processors or servers 146, data store 147, configuration running system 148, configuration validation system 150, configuration signing system 152, signature validation system 154, and other items 156. Configuration running system 148 can run the code in configuration C 142, once it is deployed to the computing system node 130. Configuration validation system 150 determines whether the code in configuration C 142 has run properly and, if so, generates a validation signal indicating the code has been validated. Configuration signing system 152 then signs the configuration with a signature. The signature can be generated using an individual signature corresponding to computing system node 130, or using a multi-signature system, or in another way.

Signature validation system 154 is used to validate a signature on a configuration that is about to be deployed to computing system node 130. For instance, if a configuration has already been validated and signed by a different validating set of nodes, then computing system node 130 can deploy that configuration as well. However, before deploying the configuration, signature validation system 154 validates the signature on that configuration to ensure that it has been validated by the validating set of nodes.

Figure 3:
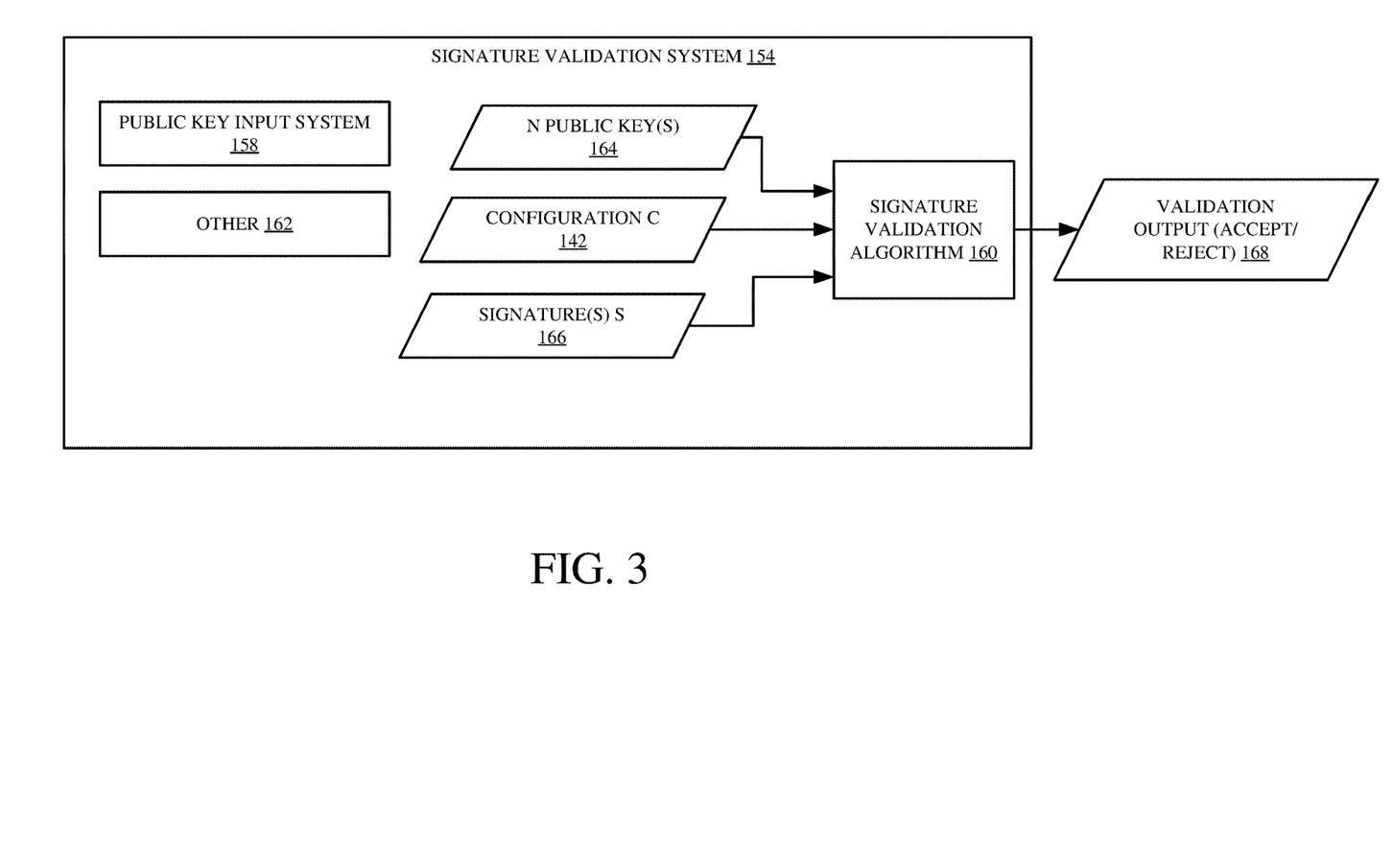
FIG. 3 is a block diagram of one example of a signature validation system.

FIG. 3 is a block diagram of one example of signature validation system 154. In the example shown in FIG. 3, signature validation system 154 includes public key input system 158, signature validation algorithm 160, and other items 162. Public key input system 158 can obtain the public keys for all of the nodes in the set of validating nodes that have validated a configuration. Those public keys are represented as N public keys 164. Signature validation algorithm 160 uses the N public keys 164, the configuration C 142, and the signature(s) 166 on the configuration C 142 and validates the signature(s) 166 on the configuration to ensure that the configuration C 142 has been validated. Signature validation algorithm 160 can generate an output 168 that either accepts or rejects the signature(s) 166. If the signature is rejected, that means that it was not validated and therefore the configuration C 142 will not be deployed in the computing system node 130. However, if the signature is accepted as valid, then the set of validating nodes have indeed validated and signed configuration C 142 and the configuration C 142 can be deployed on the computing system node 130.

Figure 4:
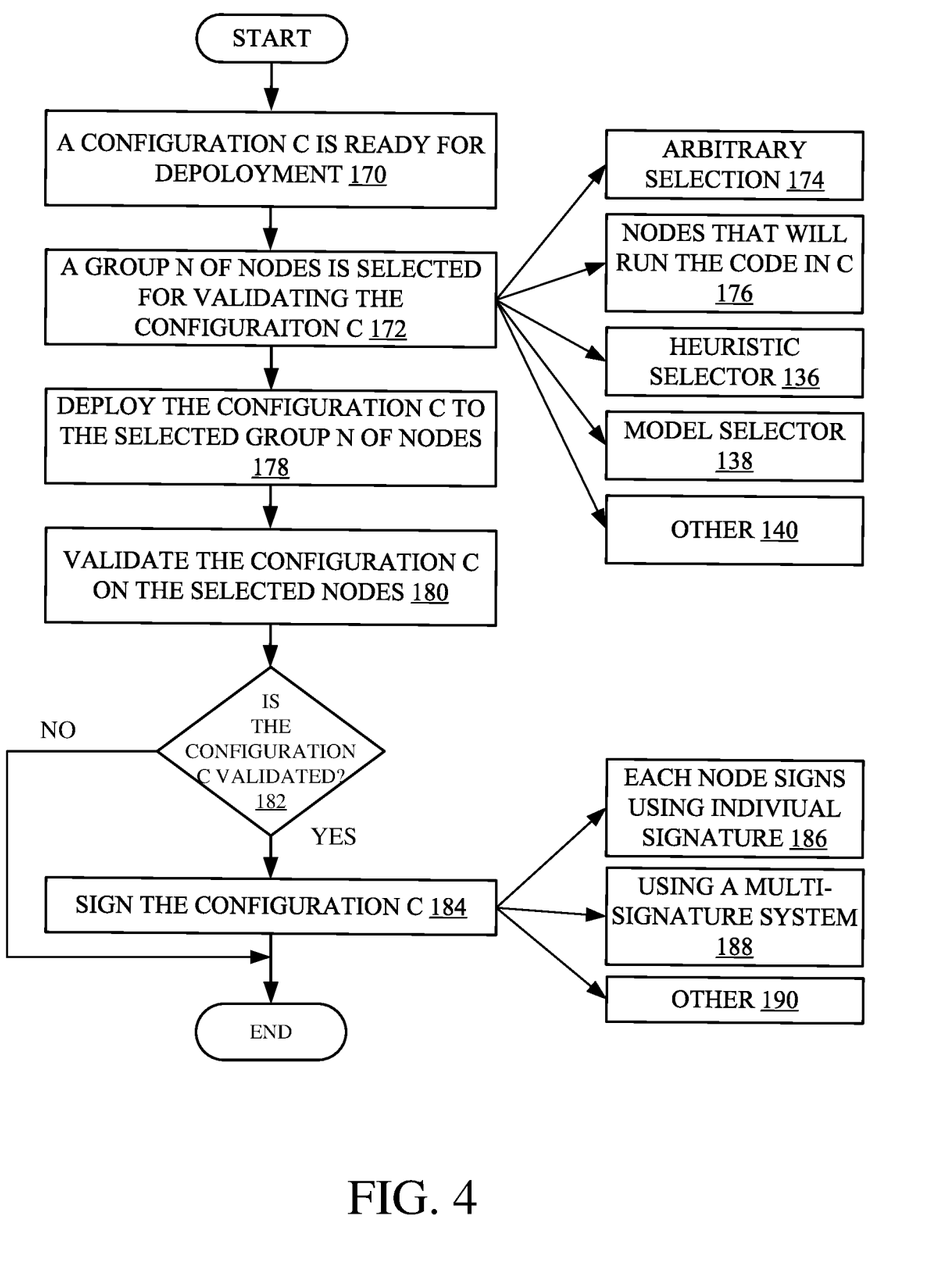
FIG. 4 is a flow diagram showing one example of validating a configuration with a group of nodes.

FIG. 4 is a flow diagram illustrating one example of the operation of computing system architecture 100 in selecting a set of nodes to run, validate, and sign a configuration C 142. It is first assumed that a configuration C 142 has been developed and is ready for deployment, as indicated by block 170 in the flow diagram of FIG. 4. Validation node selection system 128 then selects a set of validating nodes for validating the configuration C 142. Selecting a set of validating nodes is indicated by block 172 in the flow diagram of FIG. 4. System 128 can select the group N of validating nodes using arbitrary selection, as indicated by block 174. In another example, system 128 can select the set of validating nodes based on which nodes will actually run the code in the configuration C 142, as indicated by block 176. System 128 can use a heuristic selector 136, a model based selector 138, or another selector 140. The configuration C 142 is then deployed to the selected set N of validating nodes, as indicated by 178. Each of the nodes uses configuration running system 148 to run the configuration C 142 and then uses configuration C 142 validation system 150 to validate that the configuration C 142 ran properly. Validating the configuration C 142 on the selected set of validating nodes is indicated by block 180. If the configuration C 142 is validated by configuration validation system 150, as indicated by block 182, then configuration signing system 152 signs the configuration C 142, as indicated by block 184. The set of validating nodes that have run and validated the configuration C 142 can sign the configuration C 142 in a number of different ways. For instance, each node may sign using an individual signature corresponding to that node, as indicated by block 186. The nodes can sign using a multi-signature system, as indicated by block 188, or the nodes can sign the configuration in other ways 190.

Figure 5:
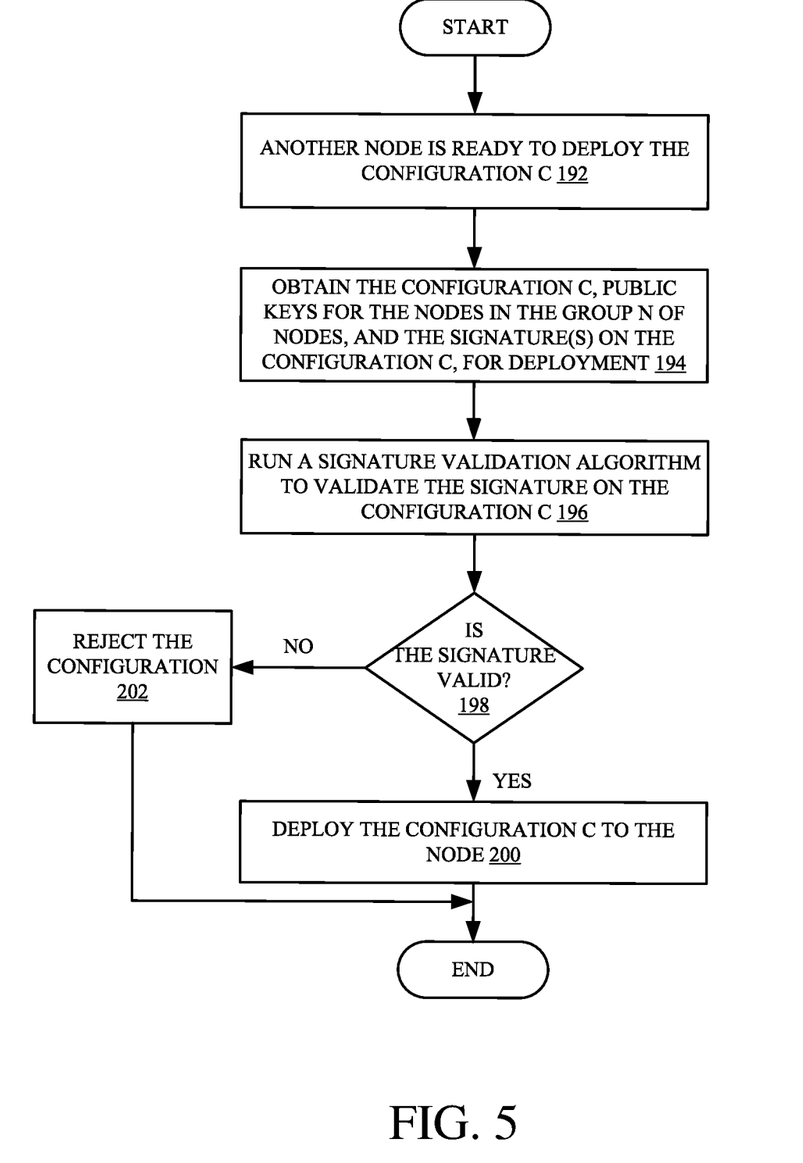
FIG. 5 is a flow diagram illustrating one example of validating a signature on a configuration before deployment of a configuration node.

FIG. 5 is a flow diagram illustrating one example of the operation of signature validation system 154 in validating a signature on a configuration C 142 that was signed by a prior set of validating nodes. Therefore, it is assumed that an additional node (a node other than the set of validating nodes) is ready to deploy the configuration C 142, after it has been validated and signed by the set of validating nodes, as indicated by block 192 in the flow diagram of FIG. 5. Signature validation system 154 obtains the configuration C 142, the public keys 164 for the various nodes in the set of validating nodes that have already validated the configuration C 142, and the signature or signatures 166 on the configuration C 142. Obtaining this information is indicated by block 194 in the flow diagram of FIG. 5. Signature validation system 154 then runs signature validation algorithm 160 to validate the signature S on the configuration C 142. Running the signature validation algorithm is indicated by block 196 in the flow diagram of FIG. 5.

If the signature S is valid, as indicated by block 198, then the node 130 deploys the configuration C 142, as indicated by block 200. However, if at block 198, signature validation algorithm 160 determines that the signature S is not valid, then the node 130 rejects the configuration C 142, and does not deploy it, as indicated by block 202.

The present description thus proceeds with respect to a system that uses a consensus based determination that a configuration C is stable and valid. Large scale rollback of configurations is not needed because the configuration will not have met the consensus in the initial set of validating nodes so it will not be deployed on any additional nodes. Similarly, the present system decouples the determination of whether the configuration C is stable from roll out to different computing system rings. Instead, once the configuration C is deemed as stable, then any arbitrary computing system node can deploy the configuration so that roll out of configuration C can be done more aggressively and more quickly.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. The processors or servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
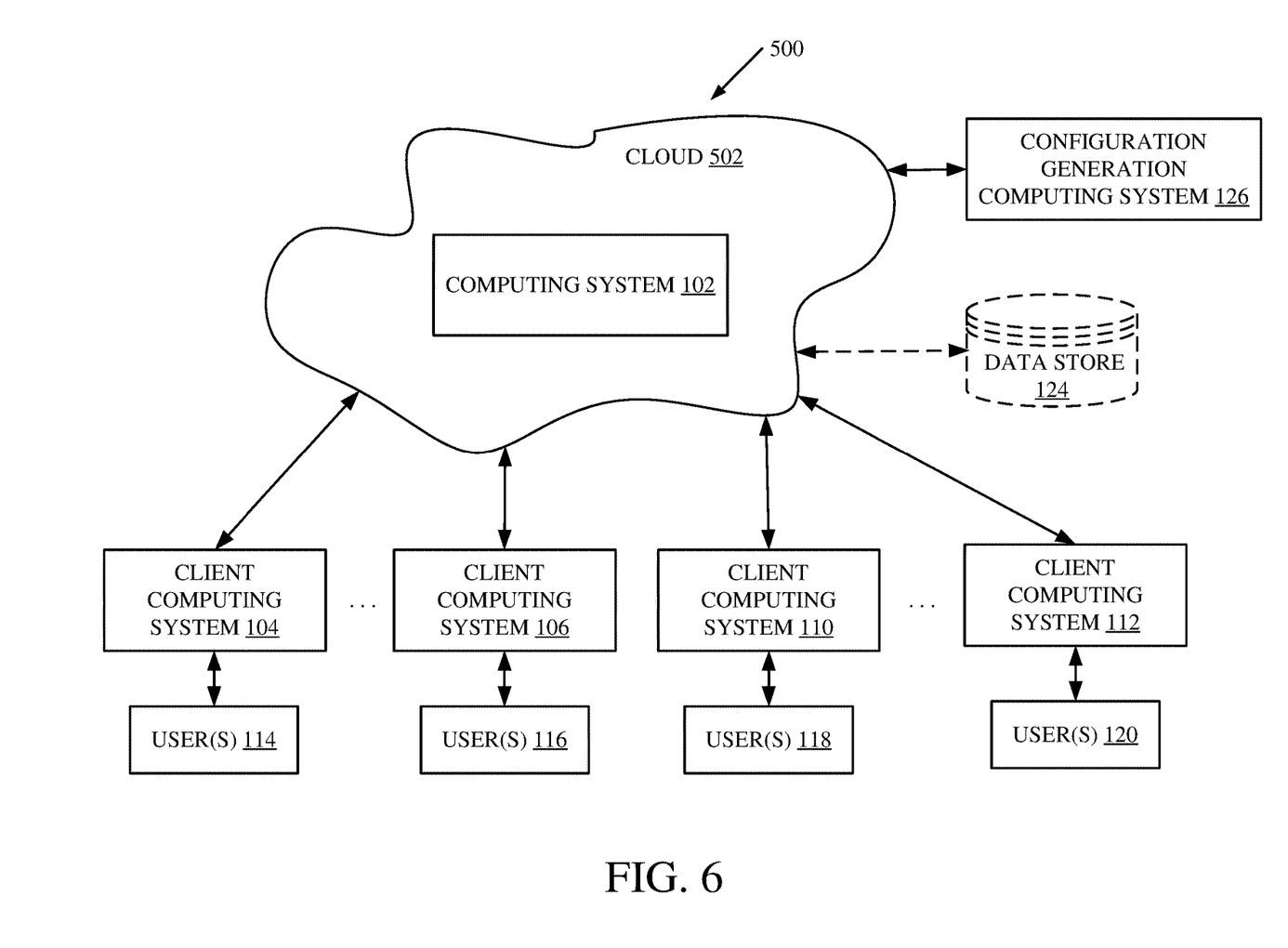
FIG. 6 is a block diagram of one example of the architecture described in previous FIGS. deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 102 can be located in cloud 502 (which can be public, private, or a combination where portions are public while others are private). Therefore, user 108 uses a user devices that run client computing systems 106-112 to access those systems through cloud 502.

FIG. 6 also depicts another example of a cloud architecture. FIG. 6 shows that it is also contemplated that some elements of computing system 102 can be disposed in cloud 502 while others are not. By way of example, data store 124 can be disposed outside of cloud 502, and accessed through cloud 502. In another example, configuration generation computing system 126 (or other items) can be outside of cloud 502. Regardless of where the components are located, they can be accessed directly by client computing systems 106-112, through a network (either a wide area network or a local area network), the components can be hosted at a remote site by a service, or the components can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
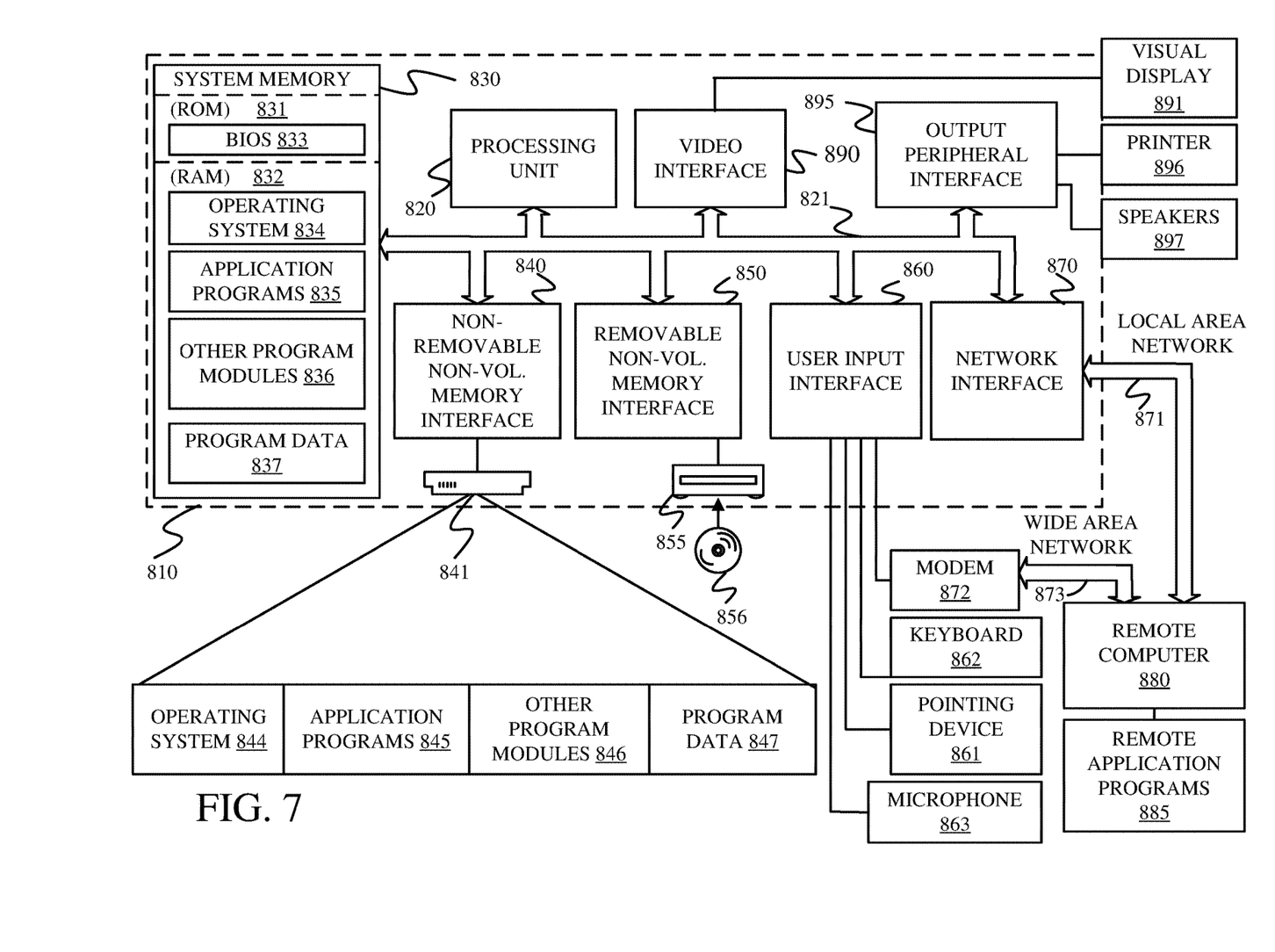
FIG. 7 is a block diagram of one example of a computing environment.

FIG. 7 is one example of a computing environment in which architecture 100, or parts of it, (for example) can be deployed. With reference to FIG. 7, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a validation node selection system that selects a group of computing system nodes in a distributed computing system as a set of selected nodes;
a configuration validation system that determines, on each of the selected nodes, whether a computing system configuration C is valid;
a configuration signing system that, if the configuration C is valid on each of the selected nodes, then signs the configuration C; and
a signature validation system that controls deployment of the configuration C to a subsequent node based on whether the configuration C is validly signed by the set of selected nodes.

Example 2 is the computing system of any or all previous examples wherein the validation node selection system is configured to select the group of computing system nodes based on a content of the configuration C.

Example 3 is the computing system of any or all previous examples wherein the validation node selection system is configured to select a node for the group of computing system nodes based on whether the selected node will attempt to run code in the configuration C.

Example 4 is the computing system of any or all previous examples wherein the validation node selection system comprises:
a heuristic selector configured to select the group of computing system nodes based on a set of heuristics.

Example 5 is the computing system of any or all previous examples wherein the validation node selection system comprises:
a selector model configured to receive a characteristic of the configuration C and to select the group of computing system nodes based on the configuration C.

Example 6 is the computing system of any or all previous examples wherein the configuration signing system is configured to sign the configuration C with each node in the selected set of nodes.

Example 7 is the computing system of any or all previous examples wherein the configuration signing system comprises:
a multi-signature system.

Example 8 is the computing system of any or all previous examples wherein the signature validation system is configured to receive the configuration and signatures on the configuration C, obtain a public key for each node in the set of selected nodes, and run a signature validation algorithm based on the obtained public keys, the configuration C, and the signatures.

Example 9 is a computer implemented method, comprising:
selecting a group of computing system nodes in a distributed computing system as a set of selected nodes;
deploying a configuration C on each computing system node in the set of selected nodes;
determining, on each of the selected nodes, whether the configuration C is valid;
if the configuration C is valid on each of the selected nodes, then signing the configuration C with each of the selected nodes; and
controlling deployment of the configuration C to a subsequent node based on whether the configuration C is validly signed by the set of selected nodes.

Example 10 is the computer implemented method of any or all previous examples wherein selecting a group of computing system nodes comprises:
selecting the group of computing system nodes based on a content of the configuration C.

Example 11 is the computer implemented method of any or all previous examples wherein selecting a group of computing system nodes based on the content of the configuration C, comprises:

selecting a node for the group of computing system nodes based on whether the selected node will attempt to run code in the configuration C.

Example 12 is the computer implemented method of any or all previous examples wherein selecting a group of computing system nodes based on the content of configuration C, comprises:

running a heuristic selector to select the group of computing system nodes based on a set of heuristics.

Example 13 is the computer implemented method of any or all previous examples wherein selecting a group of computing system nodes based on the content of the configuration C, comprises:

running a selector model to receive a characteristic of the configuration C to select the group of computing system nodes.

Example 14 is the computer implemented method of any or all previous examples wherein selecting a group of computing system nodes comprises:

selecting the group of computing system nodes arbitrarily.

Example 15 is the computer implemented method of any or all previous examples wherein signing comprises:

signing the configuration C with each node in the selected set of nodes.

Example 16 is the computer implemented method of any or all previous examples wherein signing comprises:

signing the configuration C using a multi-signature system.

Example 17 is the computer implemented method of any or all previous examples wherein controlling deployment of the configuration C comprises:

receiving the configuration and signatures on the configuration C;

obtaining a public key for each node in the set of selected nodes; and running a signature validation algorithm based on the obtained public keys, the configuration C, and the signatures.

Example 18 is a computer implemented method, comprising:

determining, on each node in a set of selected nodes in a distributed computing system, whether a computing system configuration C is valid;

if the configuration C is valid on each of the selected nodes, then signing the configuration C with each of the selected nodes; and controlling deployment of the configuration C to a subsequent node based on whether the configuration C is validly signed by the set of selected nodes.

Example 19 is the computer implemented method of any or all previous examples wherein controlling deployment of the configuration C comprises:

receiving the configuration and signatures on the configuration C;

obtaining a public key for each node in the set of selected nodes; and running a signature validation algorithm based on the obtained public keys, the configuration C, and the signatures.

Example 20 is the computer implemented method of any or all previous examples wherein determining, on each node in a set of selected nodes in a distributed computing system, whether a computing system configuration C is valid, comprises:

selecting a group of computing system nodes in a distributed computing system as a set of selected nodes; and deploying a configuration C on each computing system node in the set of selected nodes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, cause the computing system to:
select a group of computing system nodes in a distributed computing system as selected nodes;
determine, on each node of the selected nodes, whether a computing system configuration C deployed on the node is valid;
based on a determination that deployment of the computing system configuration C is valid on each node of the selected nodes, sign the computing system configuration C; and
deploy the computing system configuration C to a subsequent node based on a determination that the computing system configuration C is validly signed by the set selected nodes.

2. The computing system of claim 1 wherein the instructions, when executed, cause the computing system to select the group of computing system nodes based on a content of the computing system configuration C.

3. The computing system of claim 2 wherein the instructions, when executed, cause the computing system to select a given node for the group of computing system nodes based on whether the given node will attempt to run code in the computing system configuration C.

4. The computing system of claim 2 wherein the instructions, when executed, cause the computing system to select the group of computing system nodes based on a set of heuristics.

5. The computing system of claim 2 wherein the instructions, when executed, cause the computing system to receive a characteristic of the computing system configuration C and to select the group of computing system nodes based on the computing system configuration C.

6. The computing system of claim 1 wherein the instructions, when executed, cause the computing system to sign the computing system configuration C with each node in the selected nodes.

7. The computing system of claim 1 wherein the computing system configuration C is signed by a multi-signature system.

8. The computing system of claim 1 wherein the instructions, when executed, cause the computing system to receive the computing system configuration and signatures on the computing system configuration C, obtain a public key for each node in the selected nodes, and run a signature validation algorithm based on the obtained public keys, the computing system configuration C, and the signatures.

9. A computer implemented method, comprising:
   selecting a group of computing system nodes in a distributed computing system as a-set of selected nodes;
   deploying a configuration C on each computing system node in the selected nodes:
   determining, on each node of the selected nodes, whether the configuration C deployed on the node is valid;
   based on a determination that deployment of the configuration C is valid on each node of the selected nodes, signing the configuration C with each of the selected nodes; and
   deploying the configuration C to a subsequent node based on a determination that the configuration C is validly signed by the selected nodes.

10. The computer implemented method of claim 9 wherein selecting a group of computing system nodes comprises:
   selecting the group of computing system nodes based on a content of the configuration C.

11. The computer implemented method of claim 10 wherein selecting a group of computing system nodes based on the content of the configuration C, comprises:
   selecting a given node for the group of computing system nodes based on whether the given node will attempt to run code in the configuration C.

12. The computer implemented method of claim 10 wherein selecting a group of computing system nodes based on the content of configuration C, comprises:
   running a heuristic selector to select the group of computing system nodes based on a set of heuristics.

13. The computer implemented method of claim 10 wherein selecting a group of computing system nodes based on the content of the configuration C, comprises:
   running a selector model to receive a characteristic of the configuration C to select the group of computing system nodes.

14. The computer implemented method of claim 9 wherein selecting a group of computing system nodes comprises:
   selecting the group of computing system nodes arbitrarily.

15. The computer implemented method of claim 9 wherein signing comprises:
   signing the configuration C with each node in the selected nodes.

16. The computer implemented method of claim 9 wherein signing comprises:
   signing the configuration C using a multi-signature system.

17. The computer implemented method of claim 9 wherein controlling deployment of the configuration C comprises:
   receiving the configuration and signatures on the configuration C;
   obtaining a public key for each node in the selected nodes; and
   running a signature validation algorithm based on the obtained public keys, the configuration C, and the signatures.

18. A computer implemented method, comprising:
   determining, on each node in a set of selected nodes in a distributed computing system, whether a computing system configuration C is valid;
   if the computing system configuration C is valid on each of the selected nodes, then signing the computing system configuration C with each of the selected nodes; and
   controlling deployment of the computing system configuration C to a subsequent node based on whether the computing system configuration C is validly signed by the set of selected nodes, wherein controlling deployment of the computing system configuration C comprises:
   receiving the configuration and signatures on the computing system configuration C;
   obtaining a public key for each node in the set of selected nodes; and
   running a signature validation algorithm based on the obtained public keys, the computing system configuration C, and the signatures.

19. The computer implemented method of claim 18 wherein determining, on each node in a set of selected nodes in a distributed computing system, whether a computing system configuration C is valid, comprises:
   selecting a group of computing system nodes in a distributed computing system as a set of selected nodes; and
   deploying the computing system configuration C on each computing system node in the set of selected nodes.

20. The computer implemented method of claim 18, and further comprising:
   selecting the selected nodes based on a content of the computing system configuration C.

* * * * *